United States Patent [19]
Maruno et al.

[11] Patent Number: 5,497,448
[45] Date of Patent: Mar. 5, 1996

[54] LEARNING TYPE WAVEFORM RECOGNIZER

[75] Inventors: Susumu Maruno, Osaka; Shigeo Sakaue, Moriguchi; Yasuharu Shimeki, Suita, all of Japan

[73] Assignee: Matsushita Electric Industrial Co., Ltd., Osaka, Japan

[21] Appl. No.: 409,947

[22] Filed: Mar. 23, 1995

Related U.S. Application Data

[63] Continuation of Ser. No. 53,444, Apr. 28, 1993, abandoned.

[30] Foreign Application Priority Data

Apr. 30, 1992 [JP] Japan .................................. 4-111124

[51] Int. Cl.$^6$ .................................................. G06F 15/18
[52] U.S. Cl. ............................. 395/22; 395/23; 395/24; 382/180
[58] Field of Search .............................. 395/22, 23, 24, 395/2–41; 382/165, 170, 181

[56] References Cited

U.S. PATENT DOCUMENTS

| | | | |
|---|---|---|---|
| 3,576,976 | 5/1971 | Russo ........................................ | 395/22 |
| 4,945,494 | 7/1990 | Penz et al. .................................. | 395/22 |
| 5,058,184 | 10/1991 | Fukushima ................................. | 395/22 |
| 5,092,343 | 3/1992 | Spitzer et al. ........................... | 128/733 |

FOREIGN PATENT DOCUMENTS

| | | | |
|---|---|---|---|
| 0457325 | 11/1991 | European Pat. Off. ......... | G06K 9/66 |
| 2-275996 | 11/1990 | Japan ................................ | G10L 3/00 |
| 2-304496 | 12/1990 | Japan ................................ | G10L 3/00 |
| 3-52085 | 3/1991 | Japan ................................ | G06F 15/70 |
| 3-118605 | 5/1991 | Japan ............................ | G05B 13/02 |

OTHER PUBLICATIONS

Automatic Voice Recognition Using Artificial neural network Approach N. Bostros IEEE 14–16 Aug. 1989.

Y. Ajioka et al., "Recognition of New Spatio–Temporal Patterns by Adaptive Junction", Parallel Processing In Neural Systems And Computers, Participant's Ed., pp. 331–334 (1990).

Primary Examiner—Allen R. MacDonald
Assistant Examiner—Richemond Dorvil
Attorney, Agent, or Firm—Willian Brinks Hofer Gilson & Lione

[57] ABSTRACT

The invention is a learning type waveform recognizer that has a sequential signal extractor that extracts changes in the values of an input waveform signal at each point on the transition axis, a learning and recognition section that learns the relations between the changes extracted from the input signal and classified waveform signals and recognizes the degree of matching with the classified waveform at each point on the transition axis based on the learned relations, and an integrated recognition section that integrates the recognized results at points in an interval and performs an overall judgment by identifying the waveform of the input waveform signal.

8 Claims, 10 Drawing Sheets

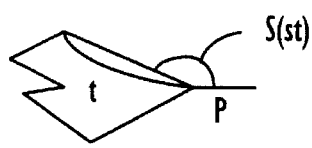
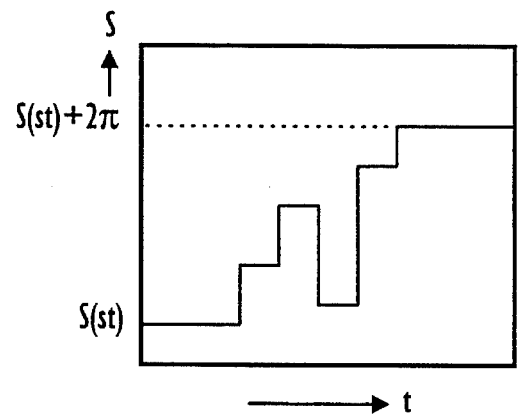
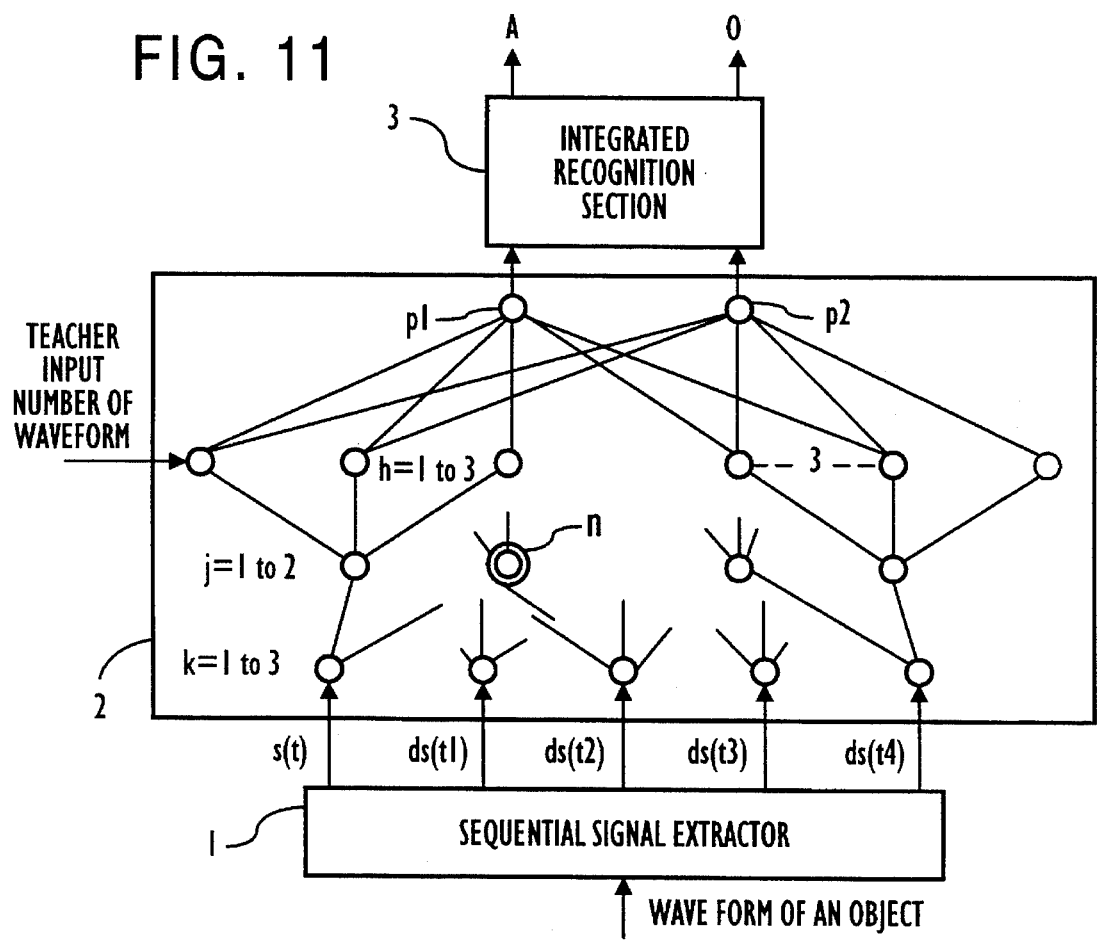

LEARNING TYPE WAVEFORM RECOGNIZER

This is a continuation application of application Ser. No. 08/053,444 filed Apr. 28, 1993 now abandoned.

BACKGROUND OF THE INVENTION

1. Field of the Invention

The present invention relates to learning type waveform recognizers that recognize waveforms of signals such as time series signals based on learning.

2. Description of the Related Art

As a prior technique for recognizing waveforms of signals there has been proposed apparatus that compares the waveform of an input signal with prepared templates of waveforms and outputs the identification number of a template having a minimum error.

FIG. 15 shows a block diagram of a prior waveform recognizor of this type. A reference numeral 93 denotes a template comparator, 91 denotes an input terminal of the comparator 93 for input signals, 92 denotes an output terminal of the comparator 93 for output signals. 94 to 97 denote prepayred templates of waveform patterns, 99 denotes a learning section, and 98 denotes an input terminal of the learning section 99 for teacher signals.

A signal to be recognized is input to the template comparator 93 through the input terminal 91. As shown in FIG. 16, the template comparator 93 successively shifts the input signal to frame the parts of the signal to be compared, compares each part with each of templates 94 to 97, and outputs the number of a template having the minimum error through the output terminal 93. If the output result is wrong, then the number of the template to which the input signal belongs is input to the learning section 99 through the input terminal 98, and the prepared templates 94 to 97 are revised. In this way the waveform recognizer learns and improves its accuracy of recognition.

The prior waveform recognizer described above has to compare each input signal with every template and successively shift the input signal, and therefore the comparison process takes a long time. Moreover, since templates have to be prepared as many as the number of the categories of waveform patterns to be classified into, mass storage is necessary for templates. Further, since learning is performed by revising templates, learning process also requires a long time.

SUMMARY OF THE INVENTION

An essential object of the present invention is therefore to provide a learning type waveform recognizer that efficiently performs learning and recognition processing in a short time and does not require templates and the like.

In order to achieve the aforementioned objective, according to one aspect of the present invention, there is provided a learning type waveform recognizer comprising a sequential signal extractor that extracts changes of an input signal at each point on the transition axis, a learning and recognition section that learns relations between changes of a signal extracted by the sequential signal extractor and waveforms of signals to be classified into beforehand and outputs recognized results at each point on the transition axis for the input signal to be recognized based on the learned results, and an integrated recognition section that integrates the recognized results at points in an interval of a predetermined width on the transition axis and performs overall judgment for identifying the waveform of the input signal.

When a signal to be recognized is input to the sequential signal extractor of the learning type waveform recognizer organized as above, the sequential signal extractor extracts changes of the input signal at that time and outputs them into the learning and recognition section. The learning and recognition section has been taught relations between the waveforms of signals to be classified into and changes of an input signal to be recognized and successively outputs the degree of local matching of the input signal with each waveform to be classified into based on the previously taught results into the integrated recognition section. The integrated recognition section integrates a predetermined number of the degrees of local matching successively output from the learning and recognition section during a predetermined time period, calculates the degree of overall matching with each waveform to be classified into, and outputs the degrees of overall matching for all categories of waveforms to be classified into as recognition results. Therefore, if a signal is input to the sequential signal extractor, then overall recognition results are successively obtained. In this way, high-speed and accurate waveform recognition is achieved by the present invention.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 10(a) and 10(b) show an example of a configuration to be recognized and a waveform signal corresponding thereto, respectively, FIG. 11 shows an embodiment of the present invention applied to the configuration recognition.

DETAILED DESCRIPTION OF THE PREFERRED EMBODIMENTS

The preferred embodiments according to the present invention will be described below with reference to the attached drawings.

Figure 1:
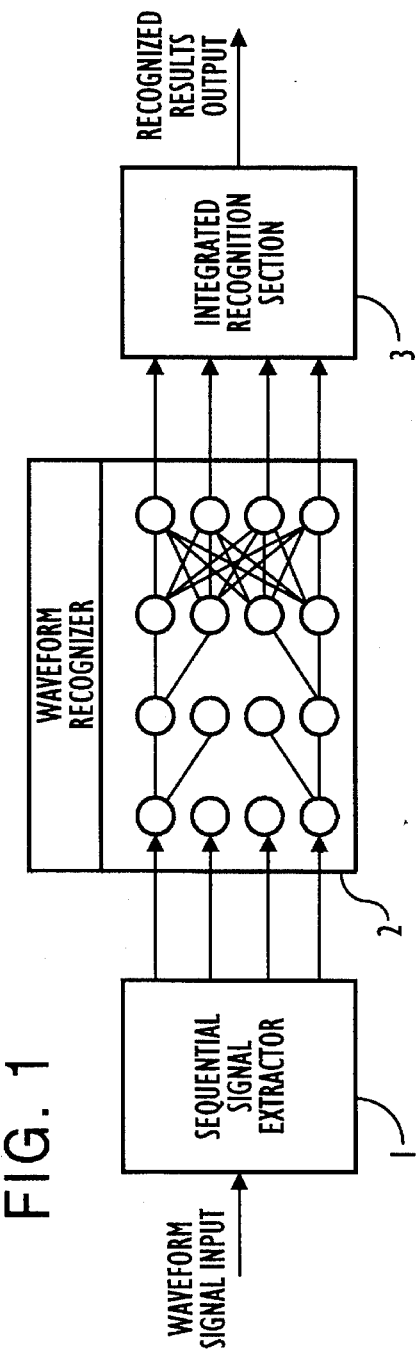
FIG. 1 shows a block diagram of an embodiment of a learning type waveform recognizer according to the present invention.

FIG. 1 shows a block diagram of an embodiment of a learning type waveform recognizer according to the present invention. A reference numeral 1 denotes a sequential signal extractor that extracts changes of an input signal at each point on the transition axis. 2 denotes a learning and recognition section that beforehand learns relations between changes of a signal extracted by the sequential signal extractor 1 and the waveforms of signals to be classified into and outputs recognition results at each point on the transition axis as degrees of matching with the waveforms having been learned beforehand. 3 denotes an integrated recognition section that integrates the recognized results of a predetermined number output as degrees of matching with the waveforms and performs overall judgment for identifying the waveform of the input signal. Therefore, the learning and recognition section successively outputs local recognition results on an input signal, and the integrated recognition section outputs final recognition results by integrating these local recognition results of a predetermined number.

Figure 2:
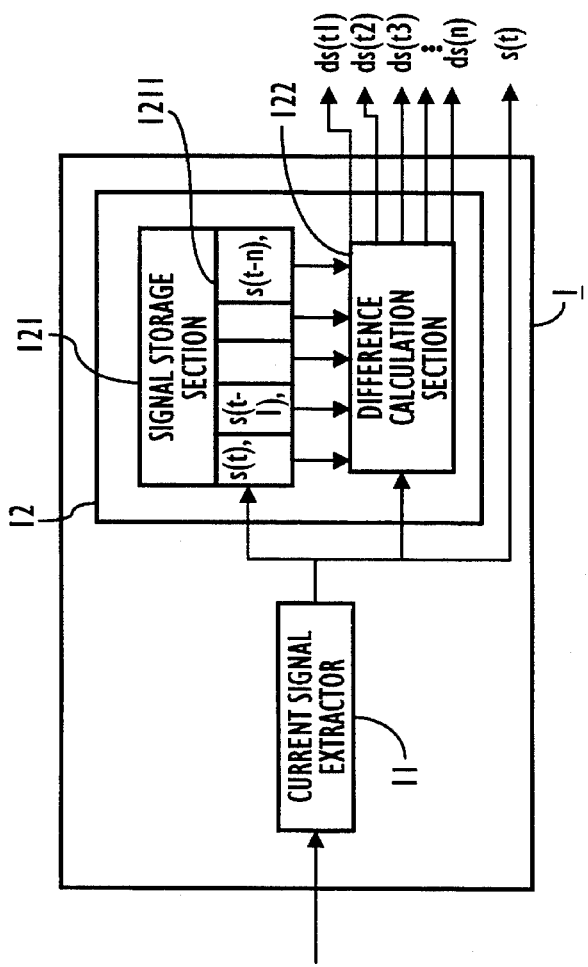
FIG. 2 shows an embodiment of a sequential signal extractor in the learning type waveform recognizer according to the present invention.

FIG. 2 shows an embodiment of sequential signal extractor 1. A reference numeral 11 denotes a current signal extractor that extracts the levels of an input signal. 12 denotes a change amount extractor that comprises a signal storage section 121 and a difference calculator 122. The signal storage section 121 comprises n +1 signal storage units 1211 and successively stores the extracted signal levels. Specifically, when signal levels extracted by the current signal extractor 11 are successively input, then the signal storage section 121 successively stores the signal levels by shifting the locations of the signal storage units 1211 as in a shift register. Therefore, when an extracted level s(t) at time t is input, the n+1 extracted levels s(t) to s(t−n) are stored. The difference calculator 122 calculates the differences ds(ti) between s(t) and s(t−i), where i=1, 2, ..., n, according to the following formula (1) and output the n differences from ds(t1) to ds(tn).

$$ds(ti)=s(t)-s(t-i) \quad (1)$$

In this way, the sequential signal extractor 1 outputs the current input level s(t) and the differences ds(t1) to ds(tn) into the learning and recognition section 2.

Figure 3:
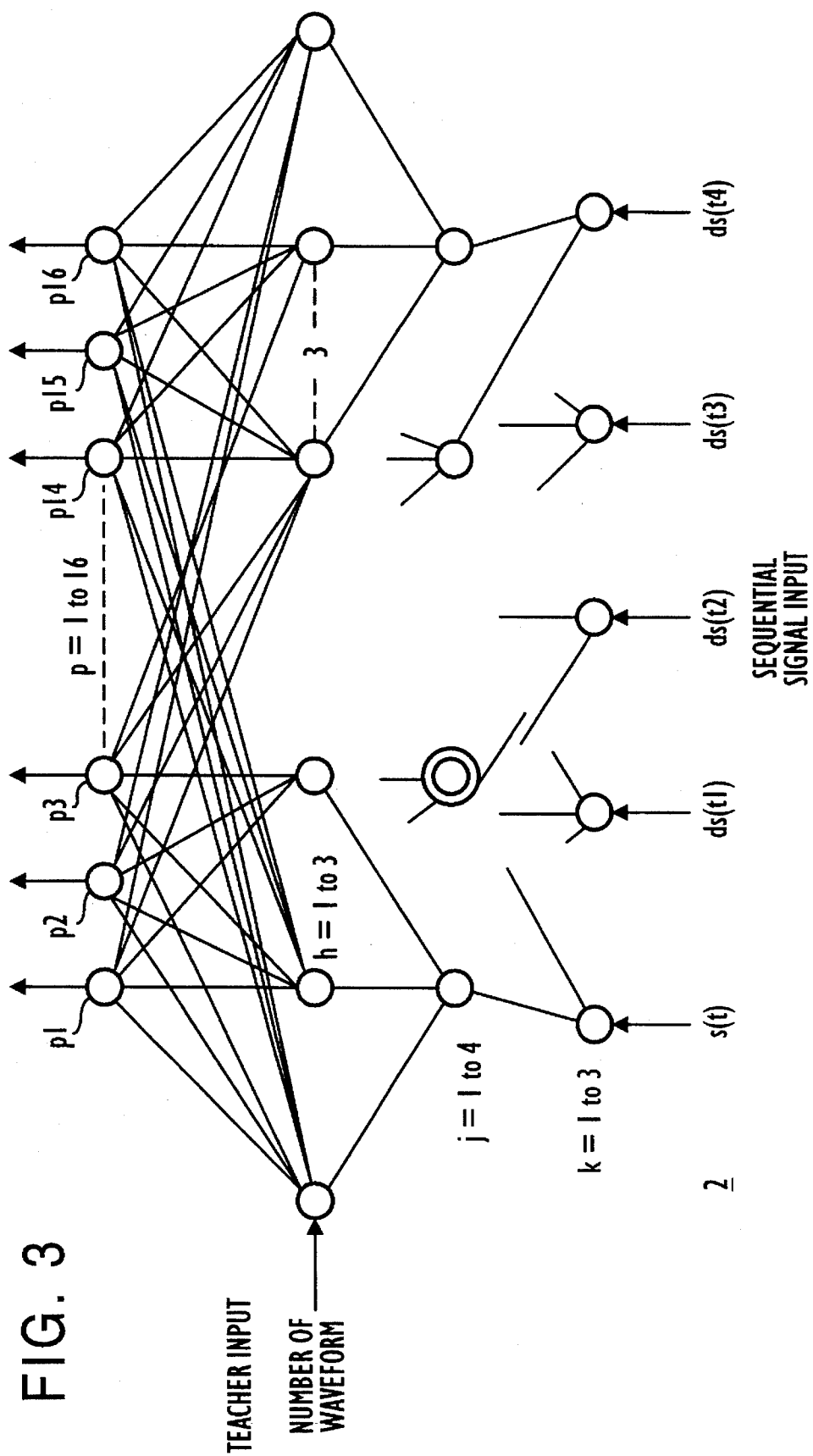
FIG. 3 shows an embodiment of the learning and recognition section in the learning type waveform recognizer according to the present invention.

FIG. 3 shows an embodiment of the learning and recognition section 2 according to the present invention. Learning and recognition section 2 tests the current input level s(t) and differences ds(t1) to ds(tn) extracted by the sequential signal extractor 1, performs local recognition at time t for the waveform of the input signal, which is constructed as a network having four layers each consisting of a plurality of elementary recognition units. The fourth layer contains 16 elementary recognition units p1 to p16 which correspond to 16 categories of waveforms to be classified into. Each elementary recognition unit pi of the fourth layer is connected to each elementary recognition unit of the third layer. The first layer consists of five terminals, each of which exclusively reads one of five sequential signals s(t) and ds(t1) to ds(t4).

Figure 4:
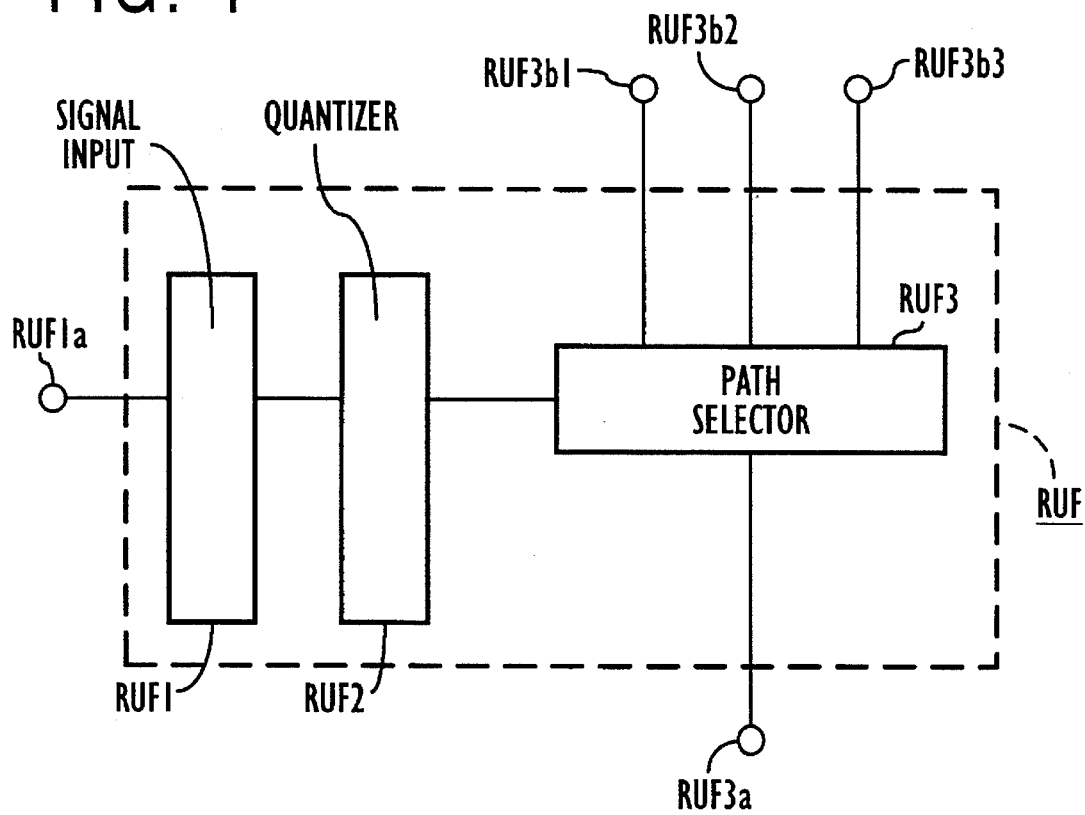
FIG. 4 shows a first embodiment of an elementary recognition unit used in the learning and recognition section of the learning type waveform recognizer according to the present invention.

FIG. 4 shows an embodiment of an elementary recognition unit RUF used in the second layer of the learning and recognition section 2. RUF1 is a signal input section and inputs a sequential signal applied to a signal input terminal RUF1a to a quantizer RUF2. The quantizer RUF2 quantizes the input sequential signal and outputs a quantized value into a path selector RUF3. In the path selector RUF3, RUF3a is a path input terminal, RUF3b1, RUF3b2, and RUF3b3 are path output terminals, each of which is connected to a path input terminal of another elementary recognition unit, when several elementary recognition units form a network. The path selector RUF3 varies connectivity between the input terminal RUF3a and each of output terminals RUF3b1, RUF3b2, and RUF3b3 based on the value input from the quantizer RUF2.

Figure 5:
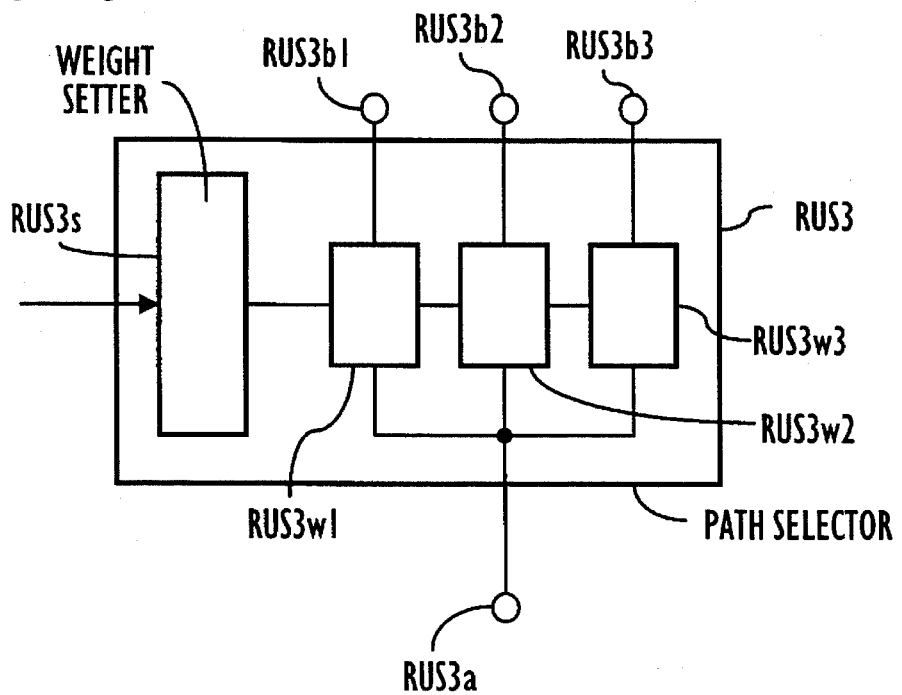
FIG. 5 shows a second embodiment of an elementary recognition unit used in the learning and recognition section of the learning type waveform recognizer according to the present invention.

FIG. 5 shows an embodiment of the path selector RUS3. Path selector RUS3 comprises one path input terminal RUS3a, three path output terminals RUS3b1, RUS3b2, RUS3b3, a weight setter RUS3s, and weights RUS3w1, RUS3w2, RUS3w3. Weights RUS3w1, RUS3w2, and RUS3w3 are weights by which a signal input through path input terminal RUS3a is multiplied, and the multiplied results are respectively output as path output signals through path output terminals RUS3b1, RUS3b2, and RUS3b3. Weight setter RUS3s sets weights RUS3w1, RUS3w2, and RUS3w3 so that the degree of connectivity between the path output terminal indicated by the output value of the quantizer RUS2 and the path input terminal RUS3a becomes maximum.

Figure 6:
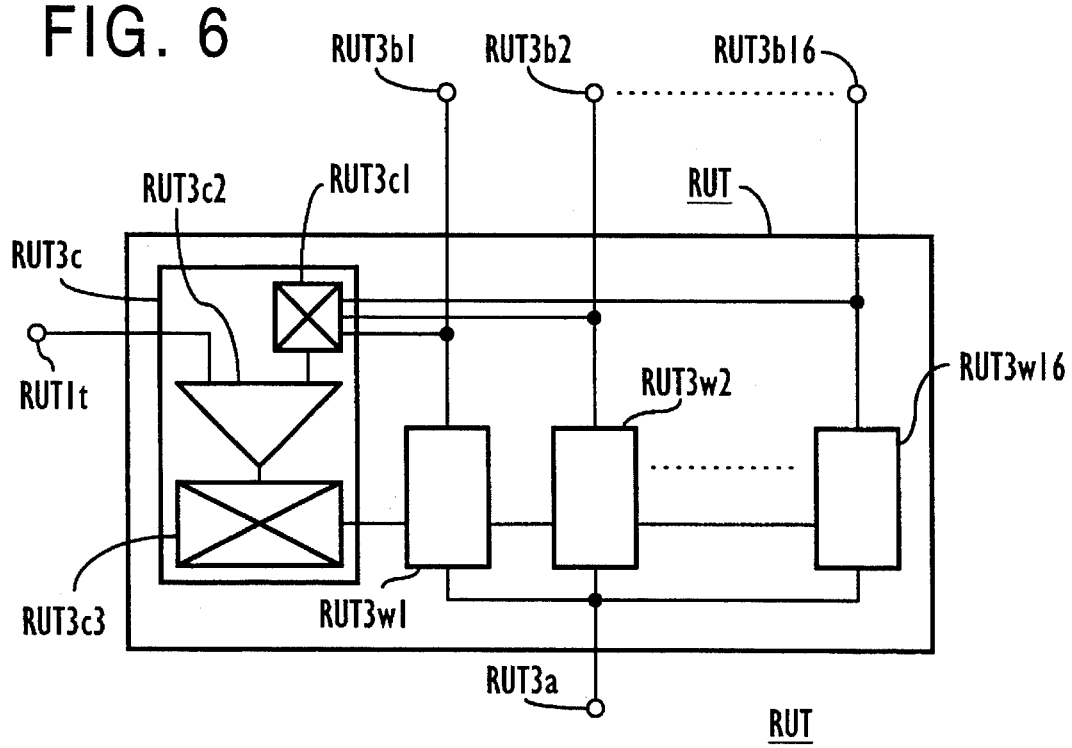
FIG. 6 shows a third embodiment of an elementary recognition unit used in the learning and recognition section of the learning type waveform recognizer according to the present invention.

FIG. 6 shows an embodiment of an elementary recognition unit used in the third layer of the learning and recognition section 2 according to the present invention. In FIG. 6, RUT1t denotes a teacher signal input terminal through which the number of a waveform to be learned, i.e., the number of an elementary recognition unit of the fourth layer, is input as a teacher signal in the learning process. RUT3a denotes a path input terminal connected to at least one elementary recognition unit of the second layer, RUT3b1 to RUT3b16 denote path output terminals, RUT3w1 to RUT3w16 denote weights by which a signal input through the path input terminal RUT3a is multiplied, and the multiplied results are respectively output through path output terminals RUT3b1 to RUT3b16 each of which is connected to the elementary recognition units p1 to p16 of the fourth layer, respectively. RUT3c denotes a path learner that varies the degree of connectivity between the path output terminal indicated by a teacher signal and the path input terminal RUT3a in the learning process. In the recognition process, no signal is input to the teacher input terminal RUTt1, and weights RUT3w1 to RUT3w16 retain values determined by the previous learning process. A signal input through the path input terminal RUT3a is multiplied by these weights RUT3w1 to RUT3w16, and the multiplied signals are respectively output through path output terminals RUT3b1 to RUT3b16. The path learner RUT3c comprises a maximum output terminal detector RUT3c1 that detects a path output terminal through which the maximum level of these output signals is output, a comparator RUT3c2 that compares the number of the path output terminal detected by the maximum output terminal detector RUT3c1 with the number of the path output terminal indicated by the teacher input signal, and a weight augmenter RUT3c3 that increases the degree of connectivity between the path input terminal RUT3a and the path output terminal indicated by the teacher input signal, i.e., the corresponding weight. The comparator RUT3c2 outputs value 0 if the above two numbers are the same, and outputs value 1 if the above two numbers are different. If the output of the comparator RUT3c2 is 0, then the weight augmenter RUT3c3 increases the degree of connectivity between the path input terminal RUT3a and the path output terminal indicated by the teacher input signal.

Figure 7:
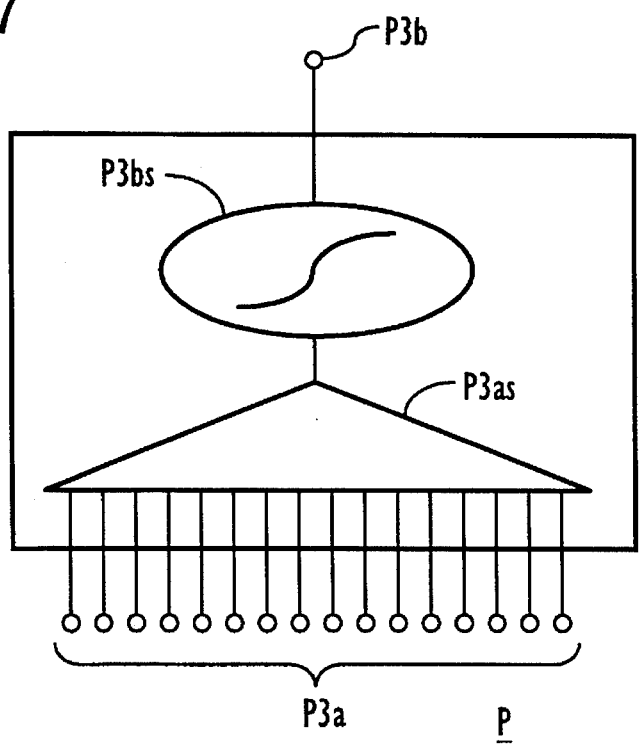
FIG. 7 shows a fourth embodiment of an elementary recognition unit used in the learning and recognition section of the learning type waveform recognizer according to the present invention.

Each of elementary recognition units p1 to p16 of the fourth layer comprises, as shown in FIG. 7, an adder P3as that adds up signals input through path input terminals P3a and a threshold processor P3bs that performs threshold processing of the signal output from the adder P3as and outputs the result through an output terminal P3b. The function used for the threshold processing may be a sigmoid function or a step function.

The learning operation of the learning and recognition section 2 shown in FIG. 3 is described below. First, a path signal of value 1 is applied to the path input terminal RUS3a of an elementary recognition unit of the second layer. When five sequential signals s(t) and ds(t1) to ds(t4) extracted by sequential signal extractor 1 are applied to the respective five input terminals of the first layer, each of these sequential signals is exclusively input to the quantizer RUS2 of the elementary recognition units of the second layer through the signal input terminal RUS1a and the signal input section i1. The quantizer RUF2 quantizes the sequential signal, and the path selector RUF3 sets the weights RUS3w1 to RUS3w3 of connectivity between an elementary recognition unit and elementary recognition units of the third layer based on the quantized value and sends path output signals to path input terminals RUT3a of elementary recognition units i of the third layer. Then each elementary recognition unit of the third layer weights the path signal input through path input terminal RUT3a with weights RUT3w1 to RUT3w16 and outputs the weighted path signals into path output terminals RUT3b1 to RUT3b16. Then the maximum output terminal detector RUT3c1 of the path learner RUT3c detects a path output terminal through which the maximum level of these path output signals is output and outputs the number of the detected path output terminal into comparator RUT3c2. The comparator i3c2 compares the number of the path output terminal detected by the maximum output terminal detector RUT3c1 with the number of the path output terminal indicated by the teacher input signal and outputs value 0 into weight augmenter RUT3c3 if the two numbers are different. If the two numbers are the same, then the comparator RUT3c2 outputs value 1 into the weight augmenter i3c3. If the output of the comparator i3c2 is 0, then the weight augmenter RUT3c3 increases the degree of connectivity between path input terminal i3a and the path output terminal indicated by the teacher input signal.

As described above, the learning process of learning and recognition section 2 of a learning type waveform recognizer according to the present invention consists in outputting sequential signals extracted by the sequential signal extractor 1 into elementary recognition units of the second layer through the input terminals of the first layer, setting connectivity between elementary recognition units of the second layer and elementary recognition units of the third layer based on output from quantizers of elementary recognition units of the second layer, and, in the third layer, varying the degrees of connectivity between path input terminals and path output terminals indicated by teacher input signals of elementary recognition units. Therefore, the learning and recognition section 2 performs learning at a very high speed.

Next, the waveform recognition operation of the learning and recognition section 3 shown in FIG. 3 is described below. As in the learning process, first, a path signal of value 1 is applied to the path input terminal i3a of elementary recognition unit i of the second layer. Then each of five sequential signals s(t) and ds(tl) to ds(t4) is exclusively input to signal input terminal RUS1a of second elementary units i of the second layer through one of five terminals of the first layer. The quantizer RUS2 of elementary recognition unit i of the second layer quantizes the sequential signal, and the path selector RUF3 sets the weights RUS3w1 to RUS3w3 of connectivity between elementary recognition unit and elementary recognition units of the third layer based on the quantized value and sends path output signals to path input terminals RUT3a of elementary recognition units of the third layer. Unlike the learning operation, the operation of waveform recognition does not input a teacher input signal to teacher signal input terminal RUT1t, and weights RUT3w1 to RUT3w16 retain the values determined by the previous learning operation. The path selector RUT3 of elementary recognition unit of the third layer weights the path signal input through path input terminal RUT3a with weights RUT3w1 to RUT3w16 and outputs the weighted path signals into path input terminals RUT3a of all the elementary recognition units pi of the fourth layer through path output terminals RUT3b1 to RUT3b16. The adder P3as of elementary recognition unit pi of the fourth layer adds up all the input path signals and sends the sum to the threshold processor R3bs. Threshold processor P3bs performs threshold processing of this sum and outputs the result into output terminal P3b. If the sum is greater than a predetermined threshold value, then the sum is output. In this way, each elementary recognition unit pi outputs the degree of matching of the original input signal with the waveform corresponding to each recognition unit pi.

As described above, the recognition process of the learning and recognition section 2 of a learning type waveform recognizer according to the present invention consists in outputting sequential signals extracted by sequential signal extractor 1 into elementary recognition units of the second layer through the input terminals of the first layer, setting connectivity between elementary recognition units of the second layer and elementary recognition units of the third layer based on output from quantizers of elementary recognition units of the second layer, and, in the third layer, weighting path signals input through path input terminals with weights determined by the previous learning operation, outputting the weighted path signals into elementary recognition units of the fourth layer, and, in the fourth layer, adding up the input path signals. Therefore, learning and recognition section 2 obtains local recognition results at every moment and, based on learned results, performs local waveform recognition at very high speed.

Figure 8:
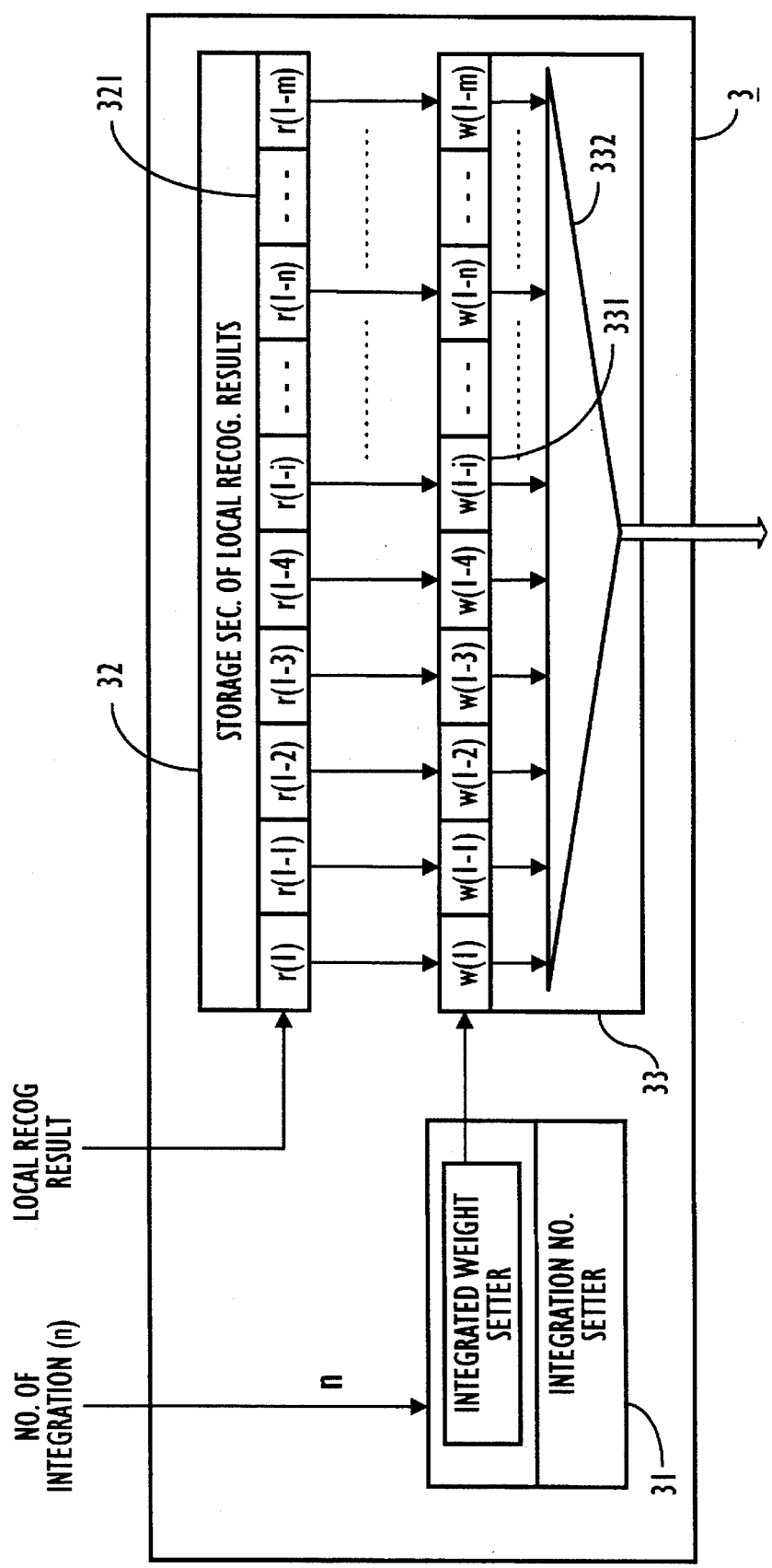
FIG. 8 shows an embodiment of an integrated recognition section in the learning type waveform recognizer according to the present invention.

FIG. 8 shows an embodiment of the integrated recognition section 3 of a learning type waveform recognizer according to the present invention. A reference numeral 32 denotes a local recognition result memory that stores local recognition results output from the learning and recognition section 2 and comprises m+1 local recognition result storage units r(t) to r(t−m). As the learning and recognition section 2 successively outputs local recognition results, the local recognition result memory 32 successively stores them by shifting the locations of the storage units as in a shift register. Therefore, if the degrees of matching with 16 waveforms at time t output from the learning and recognition section 2 are denoted by the vector r(t) = (r1(t), r2(t), ..., r16(t)), then local recognition result memory 32 stores m+1 vectors r(t), r(t−1), ..., r(t−m) as shown in FIG. 8. 33 denotes an arithmetic integration section that comprises integrating weights 331 and a sum-of-products calculator 332. 31 denotes an integration number setting section consisting of an integrating weight setter 311, which sets the values of integrating weights 331. Specifically, for example, assuming n is the number of integration, n+1 integrating weights w(t), w(t−1) , . . . , w(t−n) of the arithmetic integration section 33 corresponding to the local recognition vectors, r(t) , r(t−1) , . . . , r(t−n) are set as w(t)−w(t−1)=... =w(t−n)=1 and w(t−n −1)=w(t−n−2)=... =w(t−m)=0. Sum-of-products calculator 332 of the arithmetic integration section 33 calculates the sum of products O(t) of the local recognition vectors r(t), r(t−1), ..., r(t−m) and the integrating weights w(t) , w(t−1) , . . . , w(t−m) as shown in the following formulas (2). In this way, integrated recognition section 3 outputs the sum of products O(t)=(O1(t) ,O2(t) , . . . , O16(t)) , which represents the degrees of overall matching of the original input signal with the 16 waveforms to be classified into.

$$Oj(t) = \sum_{i=0}^{m} w(t-i) \cdot rj(t-i) \qquad (2)$$

Figure 9:
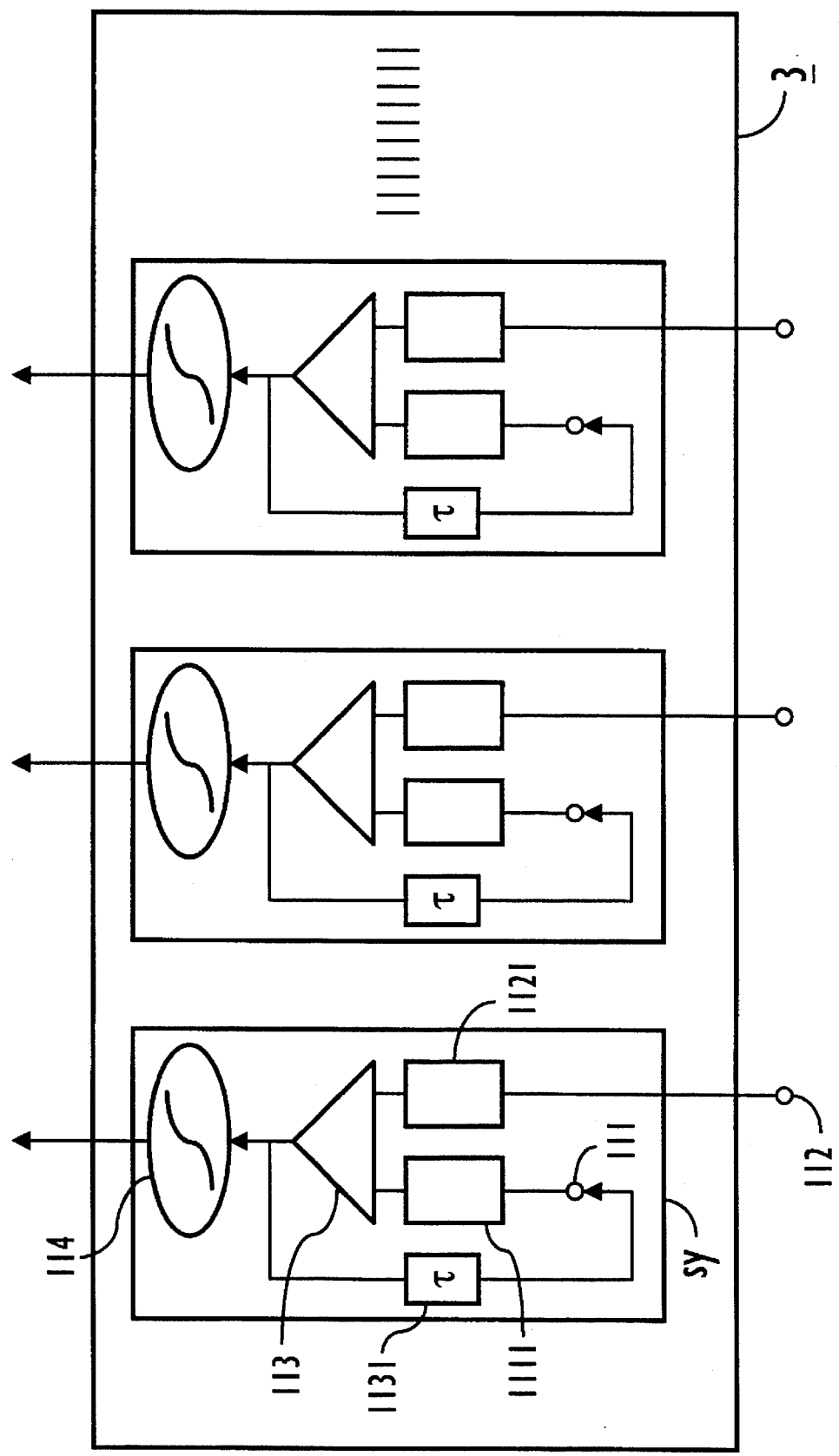
FIG. 9 shows another embodiment of the integrated recognition section in the learning type waveform recognizer according to the present invention.

FIG. 9 shows another embodiment of the integrated recognition section 3 of a learning type waveform recognizer according to the present invention. This embodiment comprises 16 integration units sy, which correspond to 16 output terminals of the learning and recognition section 2. In each integration unit sy, a reference numeral 111 denotes a self-feedback terminal, and 1111 denotes a weight for a self-feedback input signal. 112 denotes an input terminal for reading an output signal of the learning and recognition section 2, and 1121 denotes a weight for this signal. 113 denotes a sum of products calculator that calculates the sum of the product of the input value from the self-feedback terminal 111 and the weight 1111 and the product of the input value from the input terminal 112 and the weight 1121. The output of sum of products calculator 113 is input to a threshold processor 114 and also to an attenuator 1131. The attenuator 1131 attenuates the input value with a predetermined time constant τ and outputs the result into the self-feedback terminal 111. Threshold processor 114 performs threshold processing of the input value and outputs the result as a final output signal. By means of the above organization, the integrated recognition section 3 integrates local recognition results output from the learning and recognition section 2 for a time period defined by the time constant τ of the attenuator 1131 and outputs the degree of overall matching with each of 16 waveforms to be classified into through threshold processing.

Next, an embodiment of the present invention applied to configuration recognition of an object is explained.

Assuming an object to be recognized has a plurality of plane configurations as shown in FIG. 10(a). By tracing the configuration of the object in an anti-clockwise direction from a starting point p, a waveform signal as shown in FIG. 10(b) is obtained. This waveform signal is input to the sequential signal extractor 1 of the learning type waveform recognizer shown in FIG. 11. The sequential signal extractor 1 extracts the input signal S(t) and four differences d(t1) to d(t4) from the input waveform signal and outputs them to the learning and recognition section 2. The learning and recognition section 2 has a composition substantially similar to that shown in FIG. 3 and the fourth layer thereof consists of two elementary recognition units p1 and p2. The unit p1 is labeled the configuration of an object (A) to be recognized and the unit p2 is labeled and (O) other than the configuration of an object (A). The integrated recognition section 3 has a composition shown in FIG. 8 or FIG. 9 and there are provided two output terminals A and O corresponding to the configuration of an object (A) to be recognized and one (O) other than the same, respectively.

Figure 12:
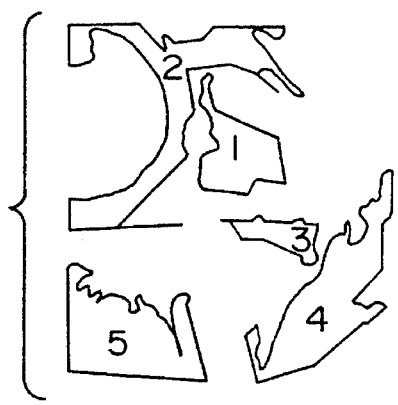
FIG. 12 shows examples of configurations to be learned.

Next, there is described an example of the learning and recognition for real objective configurations with use of the learning type waveform recognizer shown in FIG. 11. FIG. 12 shows five configurations 1 to 5 used in the present learning. As explained regarding FIGS. 10(a) and 10(b), each of five configurations 1 to 5 is transformed to a corresponding waveform signal. Learning to the learning type waveform recognizer 2 was made in such a manner that the output of the first elementary recognition unit p1 of the fourth layer became maximum always when the waveform signal corresponding to the first configuration 1 was input and, when either one of waveform signals corresponding to other configurations 2 to 5 was input, the output of the second elementary recognition unit p2 became maximum always.

Figure 13:
FIG. 13 shows a configuration deformed from the configuration 1 of FIG. 12 by noises.
Figure 14:
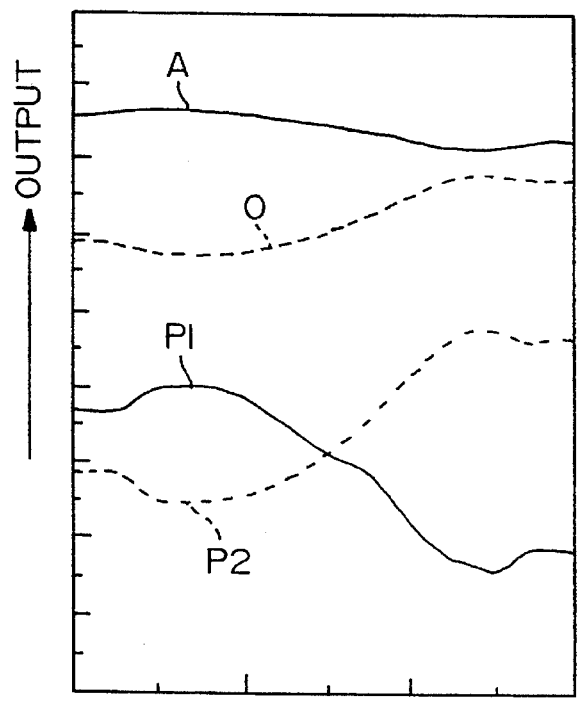
FIG. 14 is a graph showing time variations of outputs of the recognition units p1 and p2 and the output terminals A and O shown in FIG. 11.
Figure 15:
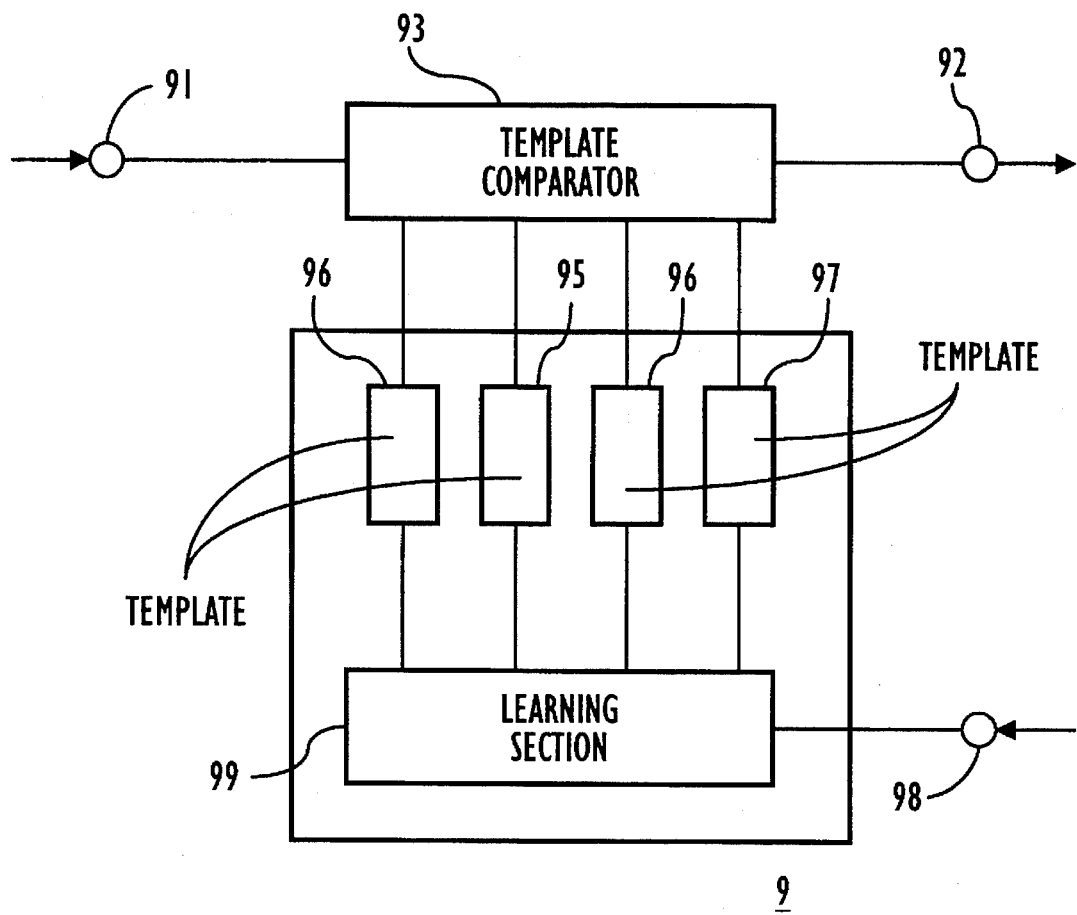
FIG. 15 shows an embodiment of a prior waveform recognizer.
Figure 16:
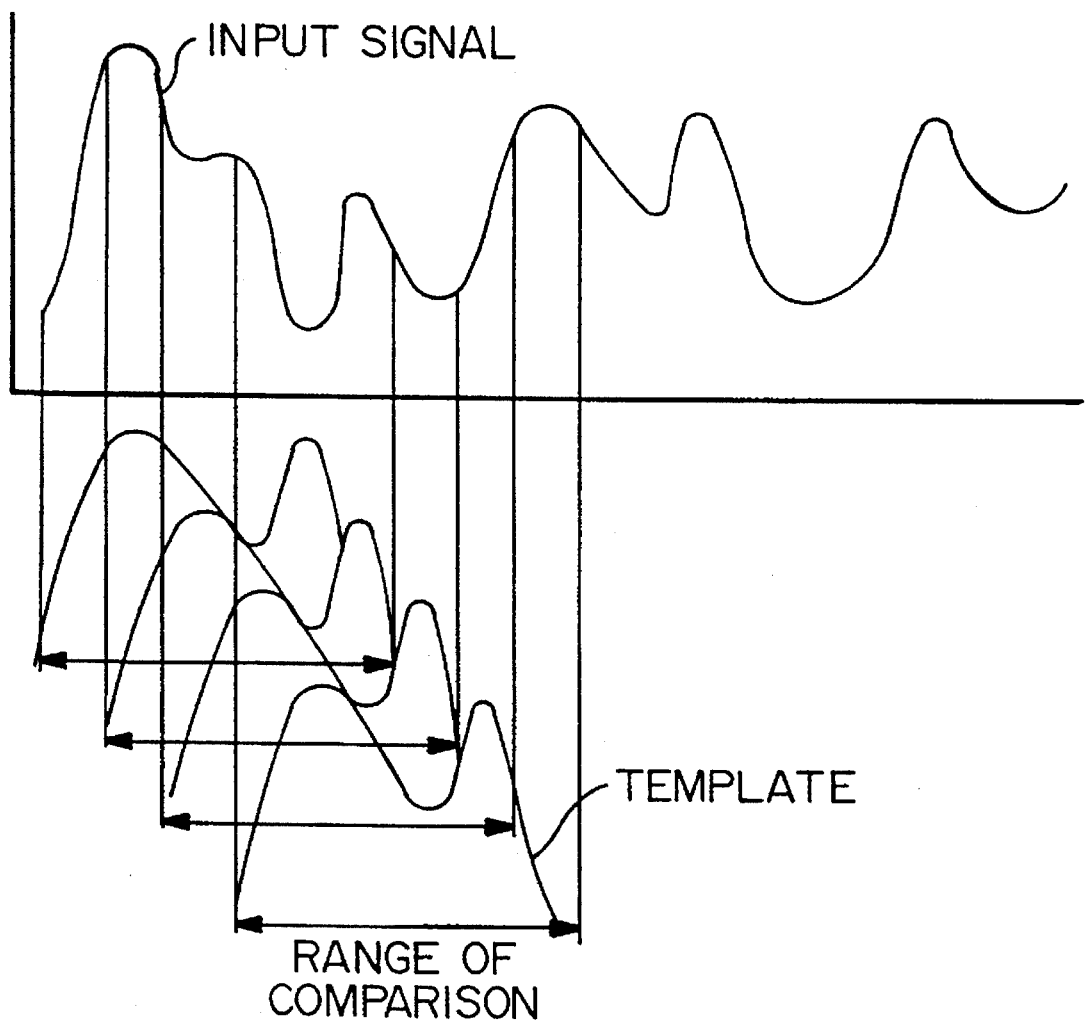
FIG. 16 shows a way of matching the waveform of an input signal with a template in the prior waveform recognizer.

FIG. 13 shows a configuration corresponding to the configuration 1 of FIG. 12 which was deformed at right side part thereof by noises. FIG. 14 shows results obtained by the learning type waveform recognizer 2 when a waveform signal corresponding to the configuration shown in FIG. 13.

In FIG. 14, there are shown time variations of outputs of the recognition units p1 and p2 of the learning type recognizer 2 and those of outputs A and O of the integrated recognition section 3 corresponding to the objective configuration to be recognized and configuration other than the former, respectively. An shown in FIG. 14, the output of the recognition unit p1 labeled to the configuration A to be recognized became maximum at first but decreased gradually as time ellapsed and the output of the recognition unit p2 labeled to a configuration O other than A became maximum later. This is due to the deformation at the right side part of the configuration shown in FIG. 13 from the correct configuration 1 of FIG. 12 and, thus, by observing outputs of the recognition units p1 and p2, it becomes possible to identify what part of the configuration considers with the learned configuration. However, since the integrated recognition section 3 integrates results from the learning type recognizer 2 for a predetermined time interval in the time transition axis, the output of the terminal A corresponding to the learned configuration became maximum for the whole time and, accordingly, correct recognition results can be obtained as a whole by the present invention.

As described above, integrated recognition section 3 outputs overall recognition results by integrating local recognition results from the present to the past, so that it performs accurate waveform recognition.

Thus the present invention provides a learning type waveform recognizer comprising a sequential signal extractor that extracts changes of an input signal at each point on the transition axis, a learning and recognition section that learns relations between the changes of a signal extracted by the sequential signal extractor and the waveforms of signals to be classified into and outputs recognized results at each point on the transition axis for a signal to be recognized based on the learned results, and an integrated recognition section that integrates the recognized results at points in an interval of a predetermined width on the transition axis and performs overall judgment for identifying the waveform of the input signal. When a signal to be recognized is input to the sequential signal extractor, then the sequential signal extractor extracts changes of the signal at that time and outputs them into the learning and recognition section. The learning and recognition section has been taught relations between the waveforms of signals to be classified into and changes of a signal to be recognized and successively outputs the degree of local matching with each waveform to be classified into based on the previously taught results into the integrated recognition section. The integrated recognition section integrates a predetermined number of the degrees of local matching successively output from the learning and recognition section during a predetermined time period, calculates the degree of overall matching with each waveform to be classified into, and outputs the category of waveforms having highest degrees of overall matching as recognition results. Therefore, if a signal is input to the sequential signal extractor, then overall recognition results are successively obtained. In this way, high-speed and accurate waveform recognition is achieved by the present invention.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A learning type waveform recognizer for recognizing a waveform of a signal comprising:

a sequential signal extractor for receiving input terminals signal and for extracting sequential changes of said input signal at each point on a transition axis;

a learning and recognition section, including an input connected to said sequential signal extractor for receiving extracted sequential changes of said input signal, and a plurality of output terminals, wherein each of said plurality of output terminals corresponds to each one of a plurality of labelled known waveforms, said learning and recognition section performing a learning operation to obtain a relationship between an output terminal and a known waveform by inputting each one of a plurality of labelled known waveforms to said learning and recognition section via said sequential signal extractor, obtaining a signal at an output terminal indicative of the maximum degree of coincidence between an inputted known waveform and an output terminal, and labelling each output terminal to correspond to each inputted known waveform, said learning and recognition section performing a recognition operation by inputting an unknown signal via said sequential signal extractor, and outputting signals from said output terminals indicative of a degree of coincidence between said unknown signal and the labelled output terminals based on said relationship between an output terminal and a known waveform; and an integrated recognition section for integrating each of said signals output from said plurality of output terminals along a transition axis and recognizing a waveform of said unknown signal based on values obtained by integration.

2. The learning type waveform recognizer according to claim 1, wherein said learning and recognition section comprises:

a network having a plurality of layers including at least first and second layers comprising a plurality of first and second recognition units interlinked to form said network, respectively, each of said plurality of first recognition units comprising:

a signal inputting unit for receiving a sequential signal extracted by said extractor, a quantizer, coupled to said signal inputting unit, for quantizing said sequential signal received by said signal inputting unit, and a path selector unit, coupled to said quantizer and having at least one path input terminal and at least one path output terminal, wherein paths are selected according to an output of said quantizer, and each of said plurality of second recognition units comprising:

at least one path input terminal, at least one path output terminal linked to said at least one path input terminal, wherein said linkage has a varying strength, and a path learning unit, for receiving a teaching signal and, according to said teaching signal, modifying the linkage strength between said at least one path input terminal and said at least one path output terminal.

3. The learning type waveform recognizer according to claim 1, wherein said sequential signal extractor comprises:

a current signal extractor for extracting a value of a signal at each point on a transition axis, and a change amount extractor for calculating each difference between a current value extracted by said current signal extractor and a value at a respective point on the transition axis.

4. The learning type waveform recognizer according to claim 3, wherein said change amount extractor comprises:

a signal memory for successively storing values at points within a predetermined width on the transition axis extracted by said current signal extractor, and a difference calculator for calculating differences between the current value and previous values stored in said signal memory.

5. The learning type waveform recognizer according to claim 1, wherein said integrated recognition section comprises:

a local recognition result memory for successively storing a predetermined number of results output from said learning and recognition section with respect to a predetermined point on the transition axis, an integration number setting section for setting a number of local recognition results to be integrated, and an arithmetic integration section for integrating local recognition results stored in said local recognition result memory and outputting integrated results.

6. The learning type waveform recognizer according to claim 5, wherein said arithmetic integration section comprises:

a plurality of integration weights, each corresponding to one of the local recognition results stored in said local recognition result memory, and a sum-of-products calculator for calculating a sum of products of said local recognition results and said corresponding weights.

7. The learning type waveform recognizer according to claim 5, wherein said integration number setting section comprises:

an integrating weight setter for setting a plurality of integrating weights, each corresponding to one of the local recognition results stored in said local recognition results memory.

8. The learning type waveform recognizer according to claim 1, wherein said integrated recognition section comprises a plurality of integration units, wherein the number of said integration units are equal to the number of output terminals of said learning and recognition section, each integration unit being exclusively connected to one of the output terminals of said learning and recognition section, each integration unit comprising an input terminal for reading an output signal of said learning and recognition section, a feedback terminal, two weights respectively corresponding to said input terminal and said feedback terminal, a sum-of-products calculator for calculating a sum of a product of a value input from said input terminal and a corresponding weight and a product of a value input from said feedback terminal and a corresponding weight, a threshold processor for performing threshold operation to an output of said sum-of-product calculator, and an attenuator for attenuating the output of said sum-of-product calculator with a predetermined time constant, the output of said sum-of-product calculator being applied to said feedback terminal through said attenuator, and the output of said sum-of-product calculator also being output from said integrated recognition section through said threshold processor.

* * * * *